(12) United States Patent
Engle et al.

(10) Patent No.: US 9,090,198 B2
(45) Date of Patent: Jul. 28, 2015

(54) HOPPER TRAILER WITH AUGER AND GRAVITY DISCHARGE

(75) Inventors: Bryce Engle, Sioux City, IA (US); Larry Minter, Jefferson, SD (US); Jon Simonsen, Quimby, IA (US)

(73) Assignee: Owen Industries, Inc., Omaha, NE (US)

( * ) Notice: Subject to any disclaimer, the term of this patent is extended or adjusted under 35 U.S.C. 154(b) by 1002 days.

(21) Appl. No.: 13/174,094

(22) Filed: Jun. 30, 2011

(65) Prior Publication Data
US 2013/0004274 A1   Jan. 3, 2013

(51) Int. Cl.
*B60P 1/42*   (2006.01)
*B60P 1/56*   (2006.01)

(52) U.S. Cl.
CPC .... *B60P 1/42* (2013.01); *B60P 1/56* (2013.01)

(58) Field of Classification Search
CPC ........ B65G 65/46; B65G 65/00; B65G 47/44; B65G 47/19; B65G 33/00; B65G 33/265; B65G 21/12; B60P 1/38; B60P 1/36; B60P 1/40; B60P 1/42; B60P 1/26; B60P 1/56; A01D 41/1217; B65F 3/22; A01C 15/003; B65B 1/18; G01G 19/393; B27N 3/143; B65D 90/587; F27D 3/08
USPC .......... 414/503, 519, 520, 523, 526; 198/532, 198/545, 548
See application file for complete search history.

(56) References Cited

U.S. PATENT DOCUMENTS

| | | | | |
|---|---|---|---|---|
| 2,479,899 A | * | 8/1949 | Beyer | 414/505 |
| 2,614,708 A | * | 10/1952 | Hoffstetter | 198/532 |
| 3,171,558 A | * | 3/1965 | Sharp | 414/505 |
| 3,179,272 A | * | 4/1965 | Goldberger | 414/504 |
| 3,521,930 A | | 7/1970 | Tucker | |
| 3,876,261 A | * | 4/1975 | Jucius et al. | 406/129 |
| 4,415,303 A | | 11/1983 | Westendorf | |
| 4,491,246 A | * | 1/1985 | Dooley | 222/129 |
| 4,646,942 A | | 3/1987 | Kuhns | |
| 5,257,893 A | | 11/1993 | Sevits | |

(Continued)

FOREIGN PATENT DOCUMENTS

| CA | 2242282 A1 | 1/1999 |
|---|---|---|
| EP | 899226 A1 | 3/1999 |

OTHER PUBLICATIONS

Product literature, Walinga, Inc., High Output Auger Unload, 2011, 7 pages.

(Continued)

*Primary Examiner* — Glenn Myers
(74) *Attorney, Agent, or Firm* — Suiter Swantz pc llo

(57) ABSTRACT

A hopper trailer for hauling bulk material. The trailer has a hopper, a gate mounted to the hopper, and a discharge system mounted to the gate. The gate has a frame with first and second discharge outlets. The first discharge outlet is positioned to discharge material by gravity beneath the gate. The discharge system receives material passing through the second discharge outlet, moves the material to an elevation that is above the gate, and discharges the material from that elevation. Preferably, the gate frame has first and second side walls within which the first and second discharge outlets are formed, respectively. Preferably, the gate has first and second doors each of which being moveable between a closed position that blocks one of the discharge outlets and an open position in which material can pass through one of the discharge outlets.

22 Claims, 11 Drawing Sheets

(56) References Cited

U.S. PATENT DOCUMENTS

| | | | |
|---|---|---|---|
| 5,465,829 A | 11/1995 | Kruse | |
| 5,468,113 A * | 11/1995 | Davis | 414/523 |
| 5,671,684 A * | 9/1997 | Lucas | 105/305 |
| 5,733,094 A | 3/1998 | Bergkamp | |
| 5,785,481 A | 7/1998 | Ockels | |
| 5,904,365 A | 5/1999 | Dillon | |
| 6,422,803 B1 | 7/2002 | Adams | |
| 6,776,569 B1 * | 8/2004 | McMahon et al. | 414/505 |
| 6,964,551 B1 | 11/2005 | Friesen | |
| 7,350,872 B2 | 4/2008 | Wood | |
| 7,814,842 B2 * | 10/2010 | Early | 105/282.3 |
| 7,891,304 B2 * | 2/2011 | Herzog et al. | 105/286 |
| 2002/0011175 A1 * | 1/2002 | Dohr | 105/247 |
| 2005/0263031 A1 * | 12/2005 | Early | 105/247 |
| 2012/0118195 A1 * | 5/2012 | Creighton et al. | 105/377.06 |

OTHER PUBLICATIONS

Product literature, Ray-Man, Inc., Charger II-FB, Oct. 2009, 2 pages.
Product literature, Simonsen Industries, Inc., Tenders, (published more than year before Jun. 30, 2011), 8 pages.
Product literature, Walinga, Inc., Engineered transportation equipment, (published more than year before Jun. 30, 2011), 12 pages.
Product literature, Hensley Fabricating & Equipment Co., Inc., Canti Lever Lid System, (published more than year before Jun. 30, 2011), 2 pages.
Product literature, Walinga, Inc., Belt Unloader Trailer, (published more than year before Jun. 30, 2011), 1 page.
Product literature, Wilson Trailer Company, Self-Unloading Conveyor Trailer, Jan. 2009, 2 pages.
Product literature, Hensley Fabricating & Equipment Co., Inc., Bulk Feed Trailers, (published more than year before Jun. 30, 2011), 2 pages.
Product literature, Timpte, Combo Tender Hopper, Feb. 2011, 4 pages.
Product literature, Wilson Trailer Company, Wilson Double Wall Hooper-bottom Trailers, 2011, 7 pages.
Product literature, Simonsen Industries, Inc., Feed bodies, 2003, 1 page.
Product literature, Simonsen Industries, Inc., BFT Truck and Trailer mount tenders, 2003, 1 pages.
Product literature, Walinga, Inc., Bulk Commodity Trailers, 2003, 4 pages.

* cited by examiner

HOPPER TRAILER WITH AUGER AND GRAVITY DISCHARGE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a hopper trailer, and more particularly to a hopper trailer that is operable to discharge bulk material by both gravity and through an auger discharge system.

2. Description of Related Art

Conventional hopper trailers are either configured to discharge material through the bottom of the hopper by gravity to a surface beneath the trailer or to discharge material via an auger or conveyor system to an elevation that is above the bottom of the hopper. There are also a few trailers that have the ability to discharge material both by gravity and via an auger system, however, due to the configuration of these trailers it is difficult or impossible to quickly switch between the two discharge modes, and/or utilize both discharge modes simultaneously.

BRIEF SUMMARY OF THE INVENTION

One embodiment of the present invention is directed toward a trailer for hauling bulk material. The trailer has a hopper that is configured to retain the bulk material, a gate that is mounted to the hopper for regulating the discharge of bulk material through the hopper, and a discharge system that is mounted to the gate. The gate has a frame which defines first and second discharge outlets. Preferably, the frame has first and second side walls within which the first and second discharge outlets, respectively, are formed. First and second doors are supported by the frame and are each moveable between a closed position that blocks one of the discharge outlets and an open position that allows the bulk material to pass through one of the discharge outlets. The first discharge outlet is positioned to discharge bulk material by gravity beneath the gate when the first door is in its open position, and preferably is positioned such that bulk material flows unobstructed through the discharge outlet to the ground or another surface beneath the gate and permits complete evacuation of bulk material from the hopper. The second discharge outlet is positioned to discharge bulk material to the discharge system when the second door is in its open position, and preferably is positioned such that bulk material flows unobstructed through the discharge outlet to the discharge system and permits complete evacuation of bulk material from the hopper. The discharge system passes bulk material to an elevation that is above the gate, and discharges the bulk material from that elevation.

Another embodiment of the present invention is directed toward a trailer for hauling bulk material having a hopper configured to retain the bulk material, a gate that is mounted to the hopper for regulating discharge of bulk material through the hopper, and a discharge system that is mounted to the gate. The gate has a frame which defines a first discharge outlet that is positioned to discharge bulk material by gravity beneath the gate and a second discharge outlet to discharge bulk material to the discharge system. The discharge system has first, second, and third tubes to convey and ultimately discharge bulk material at an operator adjustable discharge location. The first tube receives bulk material from the second discharge outlet of the gate. The second tube has a first end that receives bulk material from the first tube and a second end that is positioned adjacent to a top of the hopper. The third tube has a first end that receives bulk material from the second tube and a discharge end for discharging the bulk material. Preferably, the second tube has a lower section that is stationary and an upper section that is rotatable with respect to the lower section and is joined to the third tube to rotate the third tube in a horizontal plane. Preferably, the third tube is operable to pivot upward with respect to the second tube to adjustably raise the discharge end above the hopper.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
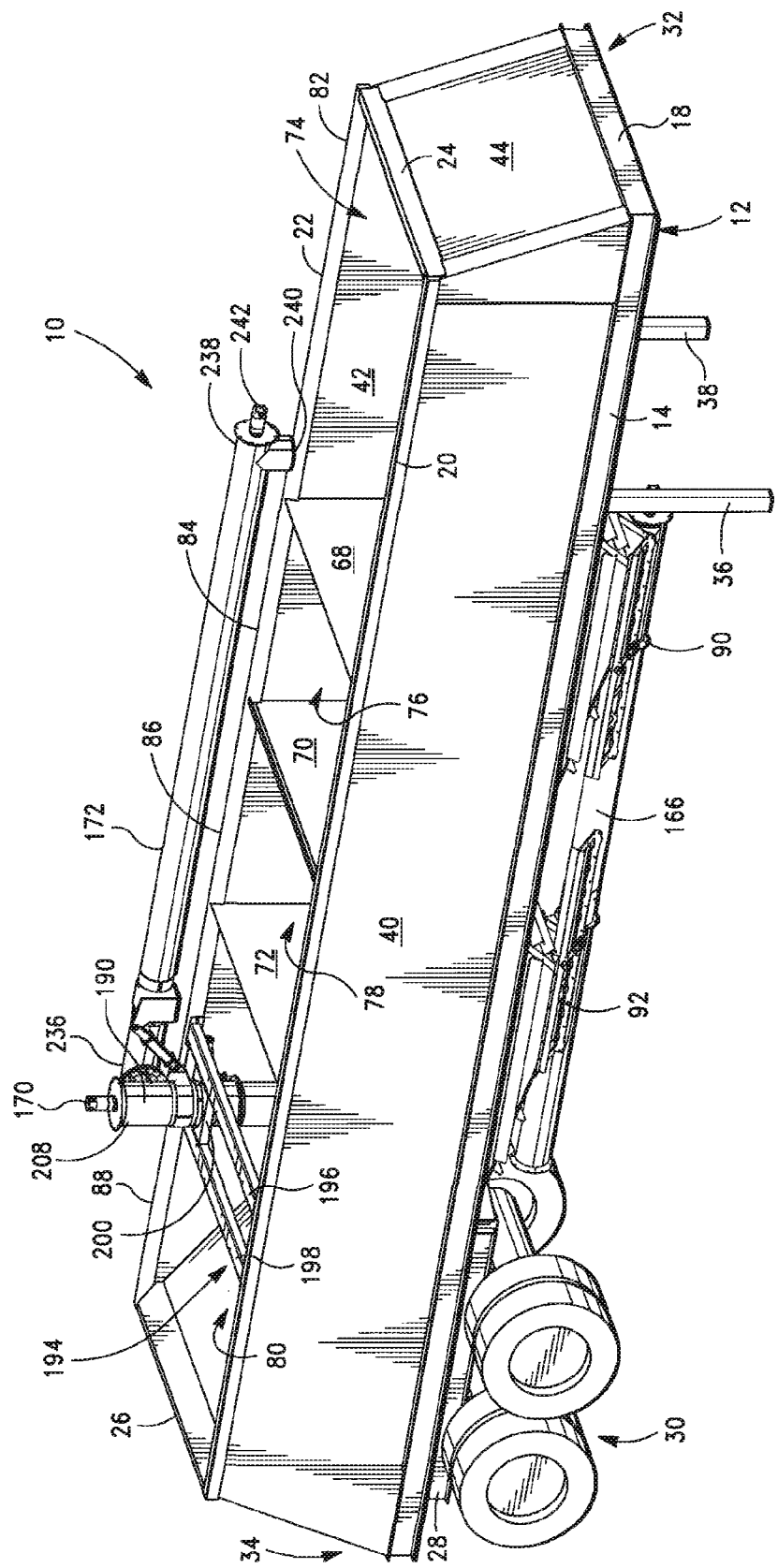
FIG. 1 is a perspective view of a hopper trailer in accordance with the present invention.

Referring to FIG. 1, an exemplary embodiment of hopper trailer in accordance with the present invention is shown and designated by the reference numeral 10. Trailer 10 has a frame 12 consisting of lower side frame members 14 and 16 (see FIG. 2) that are each joined with a lower front frame member 18 and a lower rear frame member 19 (FIG. 3) that is opposite member 18. The frame 12 also includes upper side frame members 20 and 22 that are each joined with upper front and rear frame members 24 and 26, respectively. Vertical frame members (not shown) may be joined with and extend between the lower frame members 14, 16, 18, and 19 and the upper frame members 20, 22, 24, and 26. A rear frame structure 28 is mounted to the lower frame members 14 and 16 for supporting the suspension (not shown) and wheels 30 of the trailer. The frame 12 has a front end 32 and a rear end 34. There is a coupling structure (not shown) mounted to the frame 12 adjacent to the front end 32 that permits the trailer 10 to be coupled to a motorized semi tractor. Further, there are adjustable jacks 36 and 38 mounted to frame members 14 and 16, respectively, which support the front end 32 of the trailer 10 when it is not coupled to a semi tractor.

The trailer 10 includes side walls 40 and 42 (see FIG. 2) that are each joined with front and rear end walls 44 and 46 (see FIG. 5), respectively. Side wall 40 extends between and is joined with frame members 14 and 20, and side wall 42 extends between and is joined with frame members 16 and 22 (see FIG. 2). End wall 44 is joined with and extends between frame members 18 and 24, and end wall 46 is joined with and extends between frame members 19 and 26. The trailer 10 has a length, which is the distance from end 32 to end 34, that is longer than a width, which is the distance from side wall 40 to side wall 42.

Figure 3:
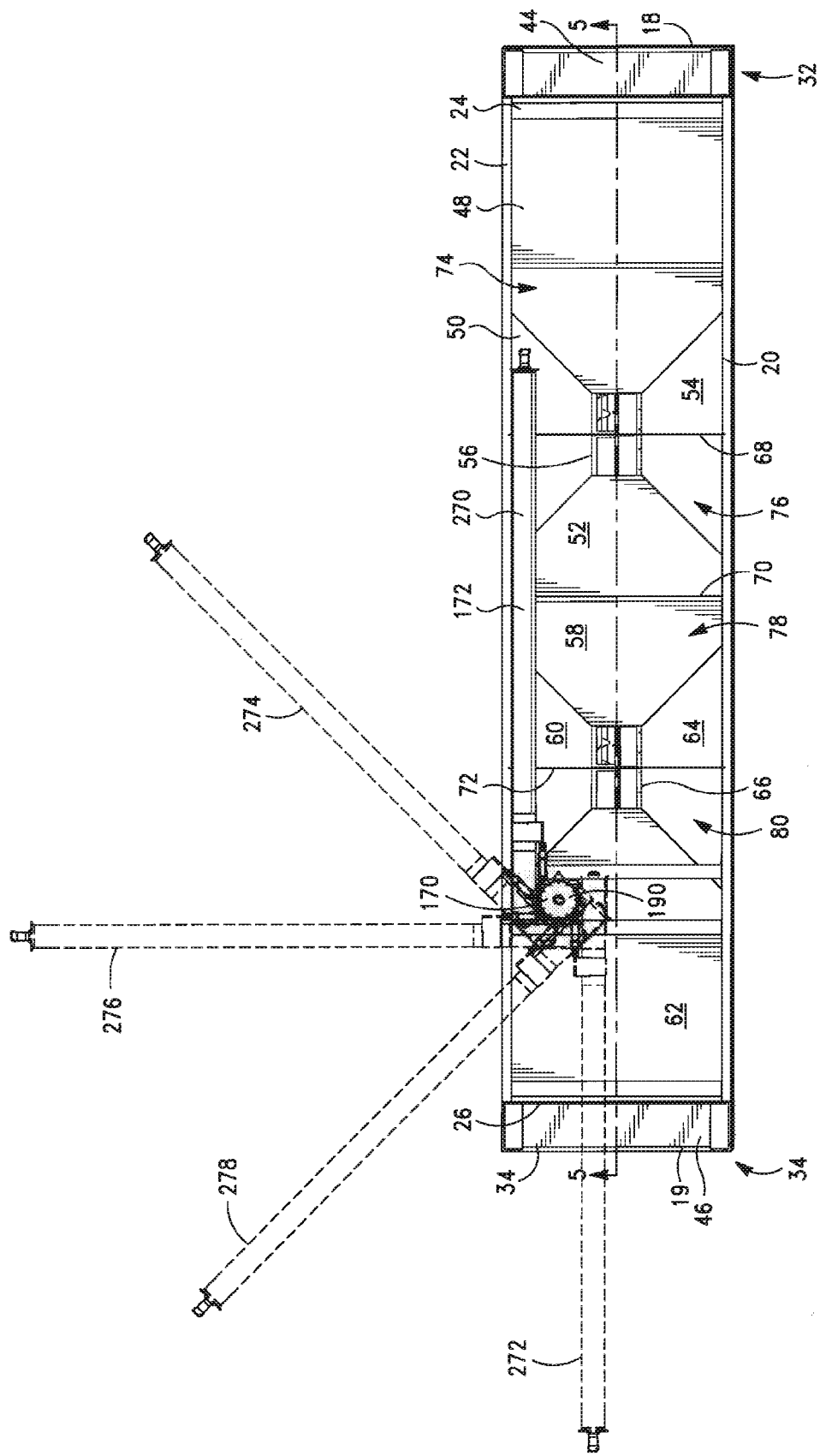
FIG. 3 is a top plan view of the hopper trailer.

Referring to FIG. 3, there are four joined, angled walls 48, 50, 52, and 54 that converge at a first bottom opening 56. Wall 48 extends from upper frame member 24 down to bottom opening 56, while walls 50, 52, and 54 extend from lower frame members 14 and 16 down to bottom opening 56. There are another four, joined angled walls 58, 60, 62, and 64 that converge at a second bottom opening 66. Wall 62 extends from upper frame member 26 down to bottom opening 66, while walls 58, 60, and 64 extend from lower frame members 14 and 16 down to bottom opening 66. Dividing walls 68, 70, and 72 are joined with and extend between side walls 40 and 42 for dividing the interior of the trailer into four hoppers 74, 76, 78, and 80.

First hopper 74 is defined by side walls 40 and 42, dividing wall 68, and angled walls 48, 50, and 54, second hopper 76 is defined by side walls 40 and 42, dividing walls 68 and 70, and angled walls 50, 52, and 54, third hopper 78 is defined by side walls 40 and 42, dividing walls 70 and 72, and angled walls 58, 60, and 64, and fourth hopper 80 is defined by side walls 40 and 42, dividing wall 72, and angled walls 60, 62, and 64. Each of the hoppers is configured to retain bulk material, such as fertilizer or grain for transport. Referring to FIG. 1, the bulk material is loaded into the hoppers 74, 76, 78, and 80 through top openings 82, 84, 86, and 88, respectively. Discharge of the material in hoppers 74 and 76 through bottom opening 56 is regulated by a first gate 90 that is mounted to angled walls 48, 50, 52, and 54, and discharge of the material in hoppers 78 and 80 through bottom opening 66 is regulated by a second gate 92 that is mounted to angled walls 58, 60, 62, and 64.

First gate 90 is described in detail below with reference to FIGS. 6-11. Because second gate 92 is substantially similar to first gate 90, second gate 92 is not described in detail herein. First gate 90 includes a frame 94 that supports first, second, and third doors 96, 98, and 100 and that mounts to the angled walls 48, 50, 52, and 54. The gate frame 94 includes first and second side walls 102 and 104, respectively, that are each joined with first and second end walls 106 and 108, respectively. Referring to FIG. 8, first and second side walls 102 and 104 have joined lower edges 102a and 104a and upper edges 102b and 104b that are spaced apart. A first door support 109a is integral with and extends outward from first side wall 102, and a second door support 109b is integral with and extends upward from second side wall 104.

Figure 7:
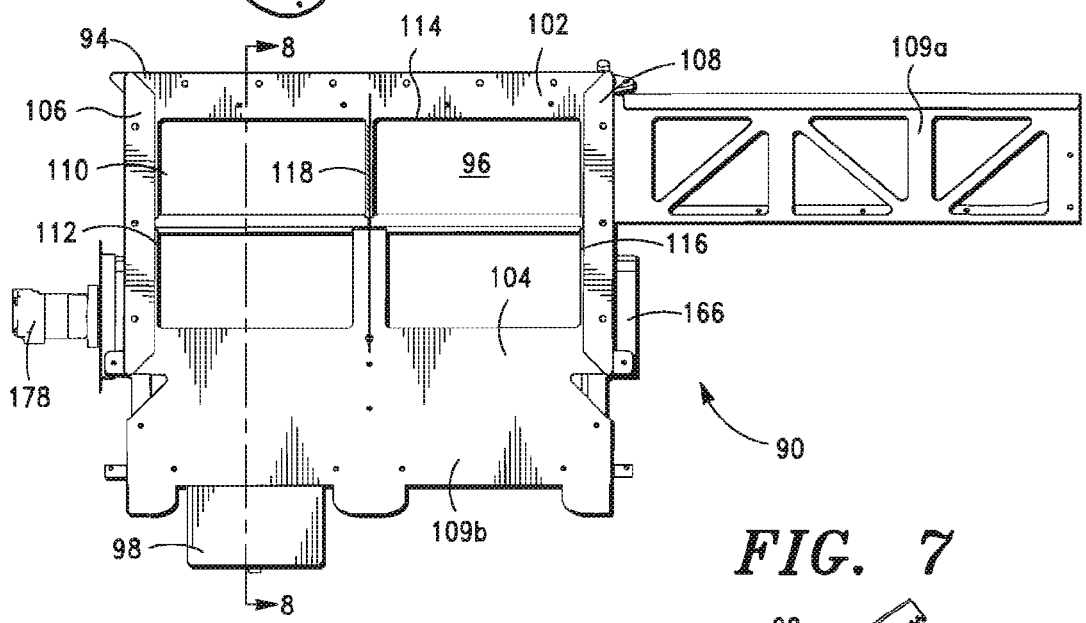
FIG. 7 is a top plan view of the gate shown in FIG. 6.
Figure 8:
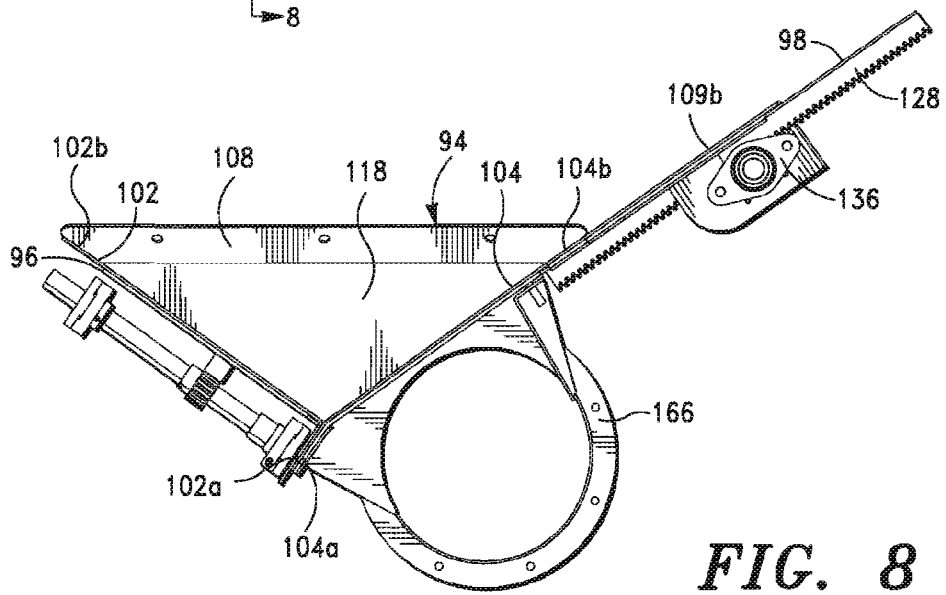
FIG. 8 is a cross-sectional view of the gate taken through the line 8-8 in FIG. 7.

Referring to FIG. 7, four discharge outlets 110, 112, 114, and 116 are formed in side walls 102 and 104. First and third discharge outlets 110 and 114 are formed in first side wall 102, and second and fourth discharge outlets 112 and 116 are formed in second side wall 104. A dividing wall 118 is joined with and extends between side walls 102 and 104 for separating first and second discharge outlets 110 and 112 from third and fourth discharge outlets 114 and 116. Dividing wall 118 abuts dividing wall 68 shown in FIG. 1 so that bulk material in hopper 74 is dischargeable through first and second discharge outlets 110 and 112 and bulk material in hopper 76 is dischargeable through third and fourth discharge outlets 114 and 116.

The first door 96 is moveable between a closed position that blocks the first and third discharge outlets 110 and 114 and an open position that allows bulk material to pass through the first and third discharge outlets 110 and 114. First door 96 can also be moved to an intermediate position in which bulk material is discharged through first discharge outlet 110 while third discharge outlet 114 is blocked by the door 96. The second and third doors 98 and 100 are moveable between closed positions in which they block the second and fourth discharge outlets 112 and 116, respectively, and open positions in which they allow bulk material to pass through the second and fourth discharge outlets 112 and 116, respectively.

Figure 10:
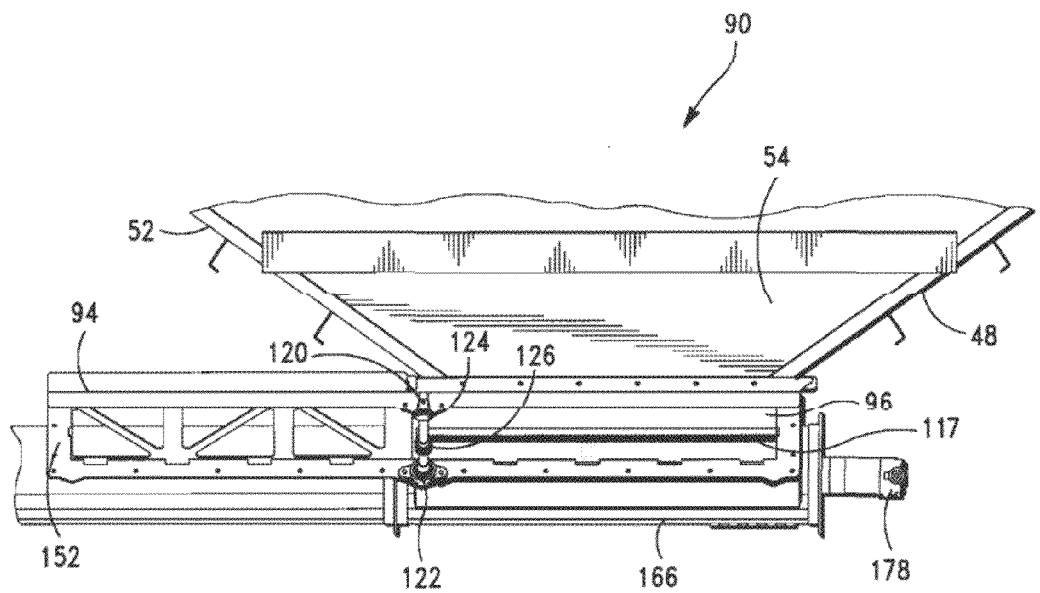
FIG. 10 is a left side elevational view of the gate shown in FIG. 6.

Referring to FIG. 10, a first rack 117 is mounted on a bottom surface of the first door 96. A first shaft 120 is rotatably mounted to the gate frame 94 with bearings 122 and 124. A first pinion 126 is mounted on the first shaft 120. The first pinion 126 engages first rack 117 for moving door 96 between its open and closed positions when first shaft 120 is rotated. The first door 96 moves in a direction that is parallel to the length of the trailer 10. Preferably, there is a U-joint (not shown) coupled to the end of first shaft 120 adjacent bearing 124. A horizontal shaft (not shown) preferably has one end that is coupled to the U-joint and an opposite end that is spaced a distance from the gate 90 at a location where an operator can engage it with a detachable hand crank (not shown). The operator uses the hand crank (not shown) to rotate the horizontal shaft (not shown) which rotates the U-joint (not shown), first shaft 120 and first pinion 126 for moving first door 96 between its open and closed positions. Alternatively, an electric motor (not shown) that is operable by remote control is used to rotate shaft 120 and move door 96 between its open and closed positions.

Figure 9:
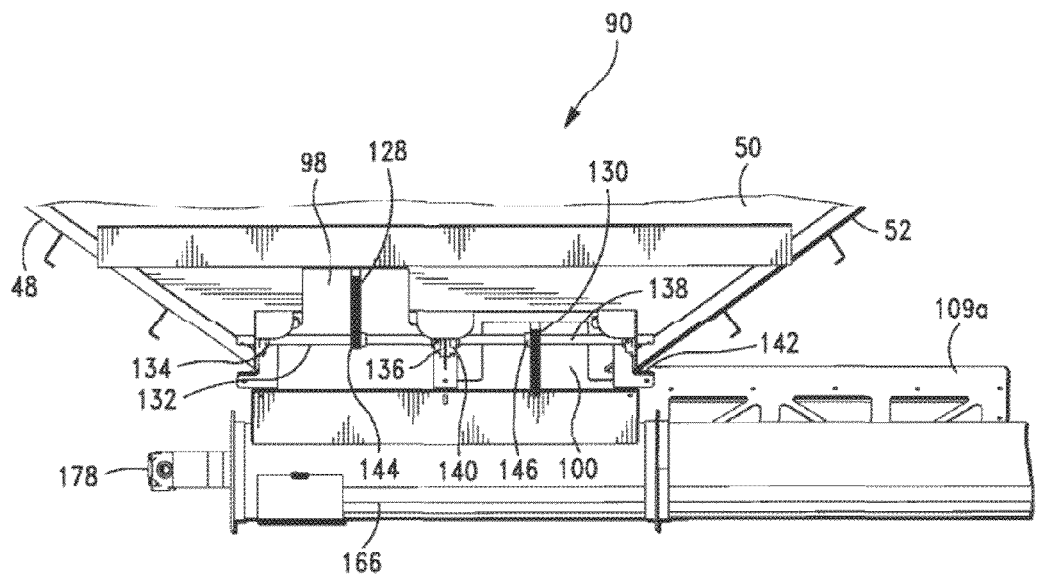
FIG. 9 is a right side elevational view of the gate shown in FIG. 6.

Referring to FIG. 9, a second rack 128 is mounted on a bottom surface of second door 98, and a third rack 130 is mounted on a bottom surface of third door 100. A second shaft 132 is rotatably mounted to gate frame 94 with bearings 134 and 136, and a third shaft 138 is rotatably mounted to gate frame 94 with bearings 140 and 142. The second and third shafts 132 and 138 mount second and third pinions 144 and 146, respectively, that engage the second and third racks 128 and 130, respectively, for moving doors 98 and 100 between their open and closed positions when second and third shafts 132 and 138 are rotated. The second and third shafts 132 and 138 rotate independently so that an operator can open and close doors 98 and 100 independently. The second and third doors 98 and 100 each move in a direction that is perpendicular to the length of the trailer 10.

Preferably, there is a U-joint (not shown) or right angle gear box coupled to the end of each of second and third shafts 132 and 138. There are horizontal shafts (not shown) that each preferably has one end which is coupled to one of the U-joints or right angle gear boxes (not shown) and an opposite end that is spaced a distance from the gate 90 at a location where an operator can engage it with a detachable hand crank (not shown). The operator uses the hand crank (not shown) to rotate the horizontal shafts (not shown) each of which rotates one of the U-joints or right angle gear boxes (not shown), one of second and third shafts 132 and 138 and one of second and third pinions 144 and 146 for moving one of second and third doors 98 and 100 between its open and closed positions. Alternatively, an electric motor (not shown) that is operable by remote control is used to rotate shafts 132 and 138 for moving doors 98 and 100 between their open and closed positions.

Figure 11:
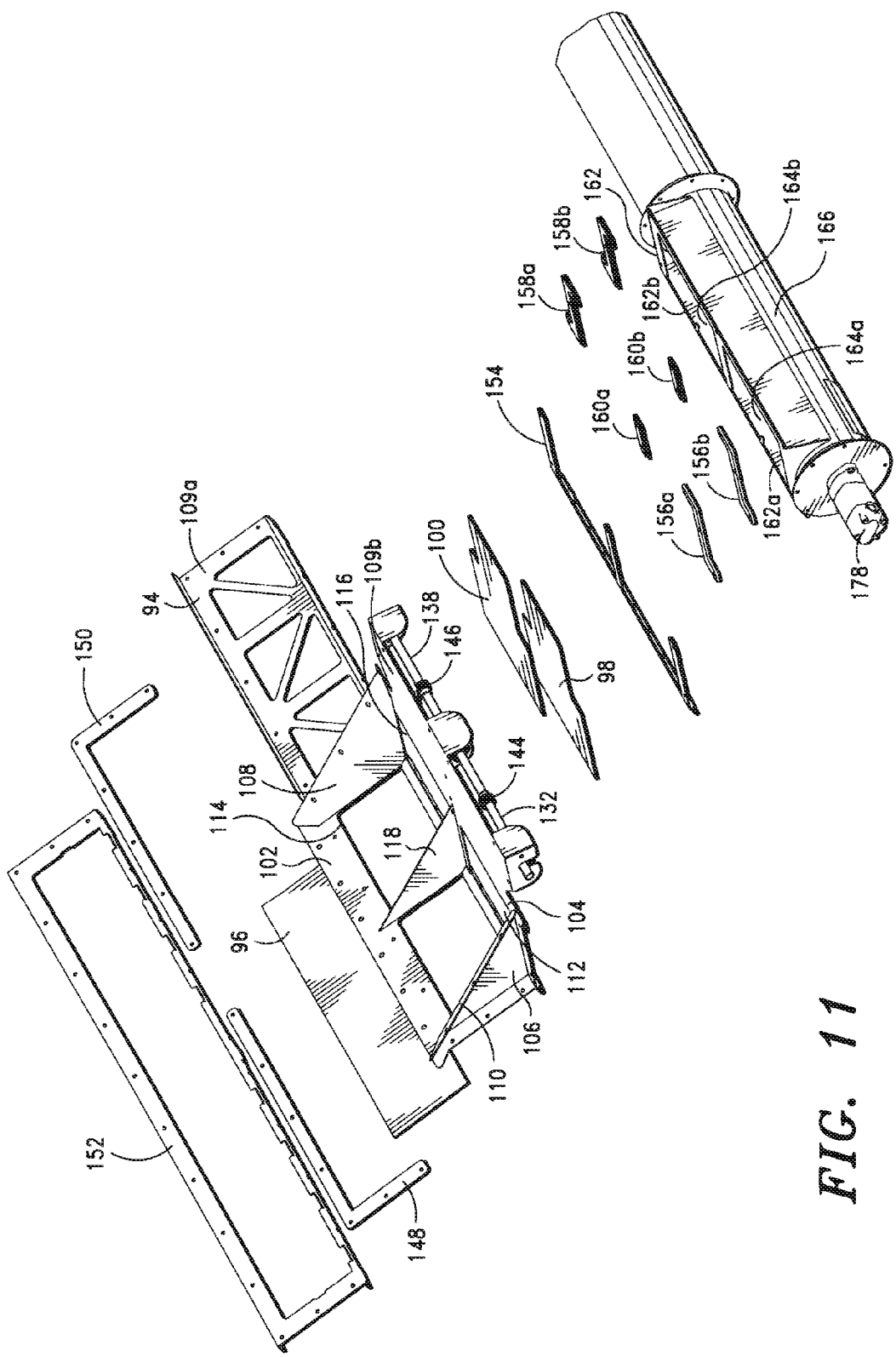
FIG. 11 is an exploded view of the gate shown in FIG. 6.

Referring to FIG. 11, frame 94 includes two L-shaped brackets 148 and 150 and a rectangular door support frame 152 that mount to the underside of first side wall 102 and first door support 109*a* beneath door 96. Brackets 148 and 150 and frame 152 along with side wall 102 and first door support 109*a* support door 96 and form a track that allows door 96 to move between its open and closed positions with rotation of shaft 120 (FIG. 10). There is also a door support frame 154, four Z-shaped brackets 156*a*, 156*b*, 158*a*, and 158*b*, two rectangular brackets 160*a* and 160*b*, and an auger tube inlet frame 162 that mount to the underside of second side wall 104 and second door support 109*b* beneath doors 98 and 100. Frame 154, brackets 156*a*-160*b*, and auger tube inlet frame 162 along with side wall 104 and second door support 109*b* support doors 98 and 100 and form tracks that allow the doors 98 and 100 to move between their open and closed positions with rotation of shafts 132 and 138, respectively. Auger tube inlet frame 162 includes two joined rectangular sections 162*a* and 162*b* each defining an opening 164*a* and 164*b*, respectively. Auger tube inlet frame 162 is joined to a first auger tube 166 that is described in detail below. Bulk material passing through second opening 112 when door 98 is in its open position enters auger tube 166 through opening 164*a*, and bulk material passing through fourth opening 116 when door 100 is in its open position enters auger tube 166 through opening 164*b*.

When door 96 is in its open position, bulk material passes through first and third discharge outlets 110 and 114 from hoppers 74 and 76, respectively, and is discharged by gravity to the ground or other surface beneath the gate 90 and trailer 10. There are no obstructions to block the flow of bulk material through discharge outlets 110 and 114 when door 96 is in its open position in order to facilitate the quick unloading of hoppers 74 and 76. Additionally, when door 96 is in its open position, hoppers 74 and 76 are able to be completely evacuated through discharge outlets 110 and 114, respectively, such that no bulk material remains in the hoppers. As discussed above, door 96 can also be opened to an intermediate position in which bulk material is discharged through first discharge outlet 110 but not through third discharge outlet 114. When door 98 is in its open position, bulk material passes through second discharge outlet 112 from hopper 74 and is discharged into first auger tube 166. Likewise, when door 100 is in its open position, bulk material passes through fourth discharge outlet 116 from hopper 76 and is discharged into first auger tube 166. When doors 98 and 100 are in their open positions, hoppers 74 and 76, respectively, are able to be completely evacuated without obstruction into auger tube 166 through discharge outlets 112 and 116, respectively, such that no bulk material remains in the hoppers. Gate 92 has a similar structure as gate 90 such that it includes a pair of discharge outlets for completely discharging bulk material by gravity from hoppers 78 and 80 unobstructed to the ground or other surface beneath the gate 92 and trailer 10, and a pair of discharge outlets each for separately, completely discharging bulk material from one of hoppers 78 and 80 unobstructed into first auger tube 166.

Figure 2:
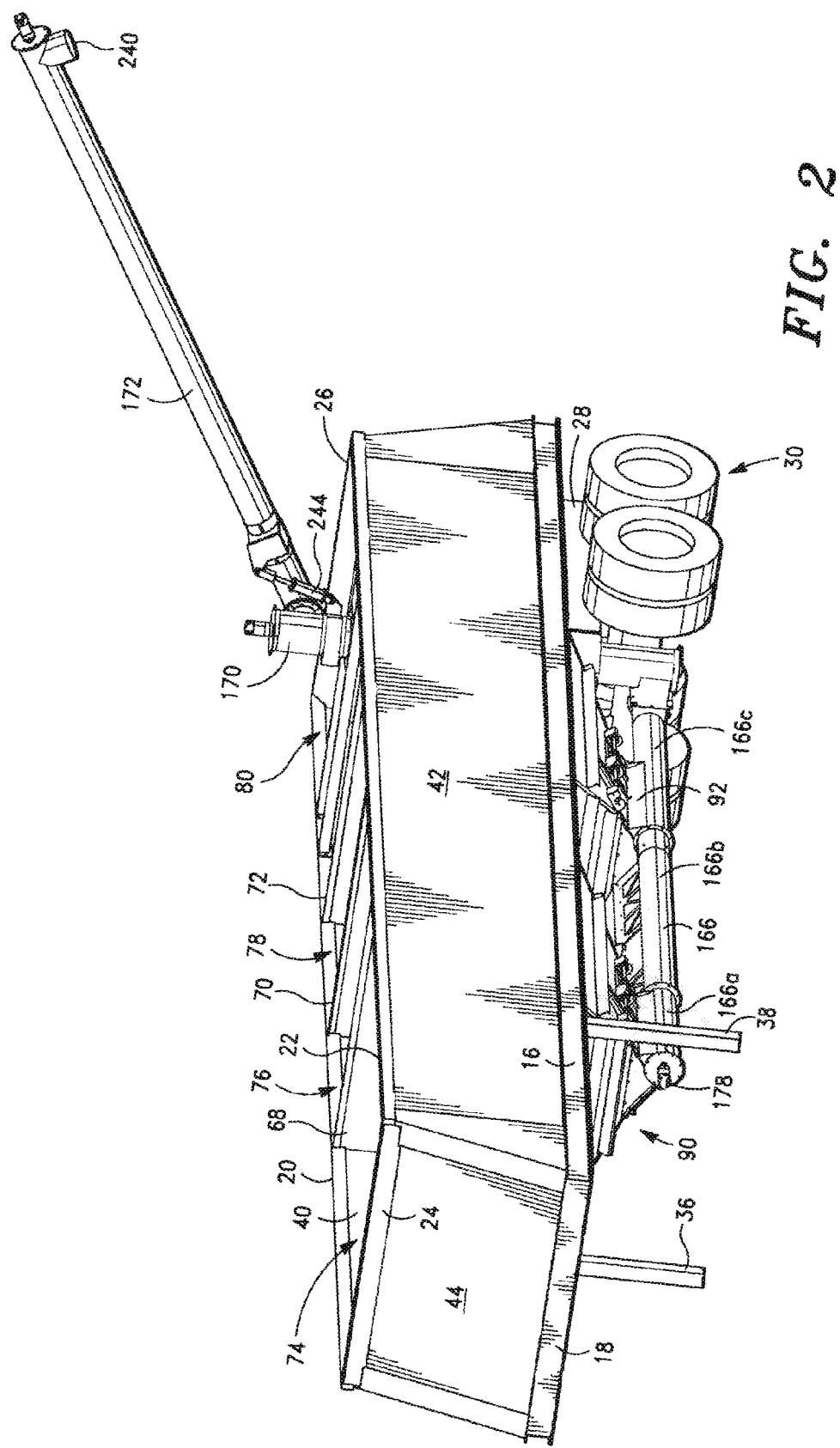
FIG. 2 is another perspective view of the hopper trailer showing an upper auger tube raised and rotated to extend outward from a side of the trailer.
Figure 5:
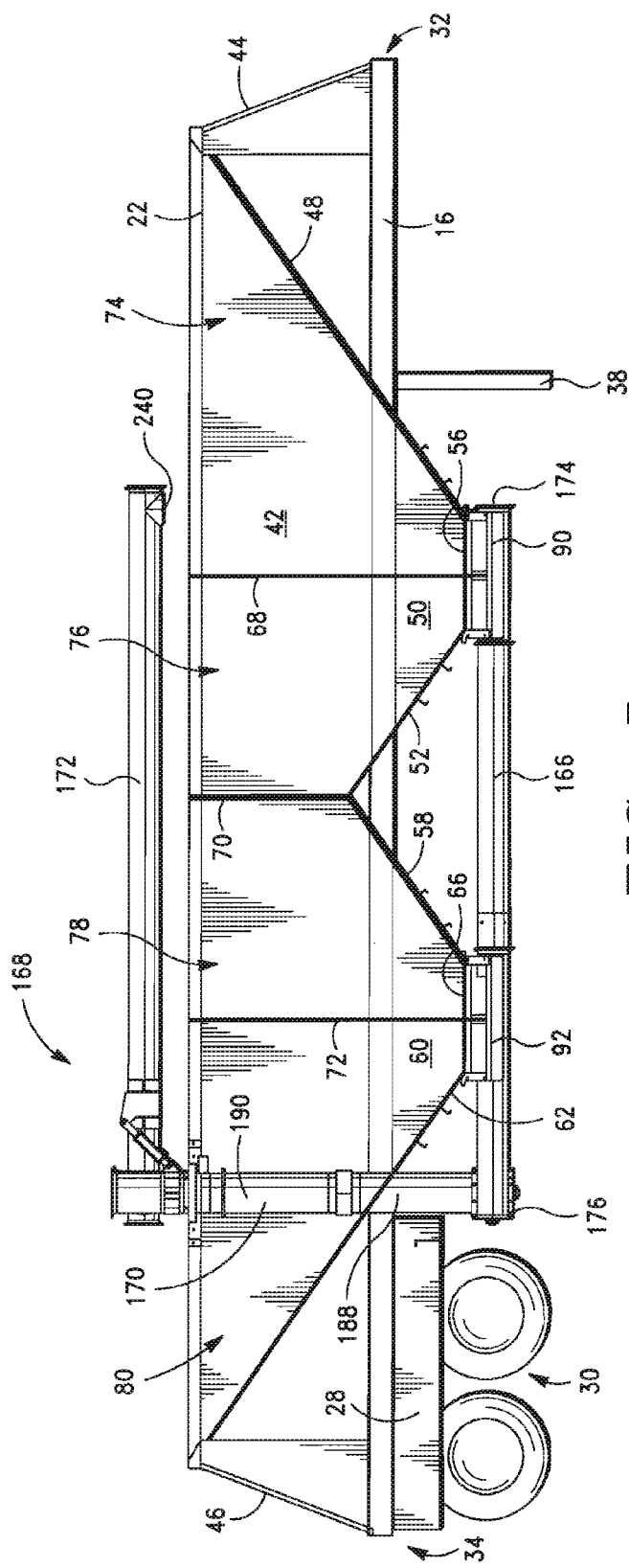
FIG. 5 is a cross-sectional view of the hopper trailer taken through the line 5-5 in FIG. 3.
Figure 6:
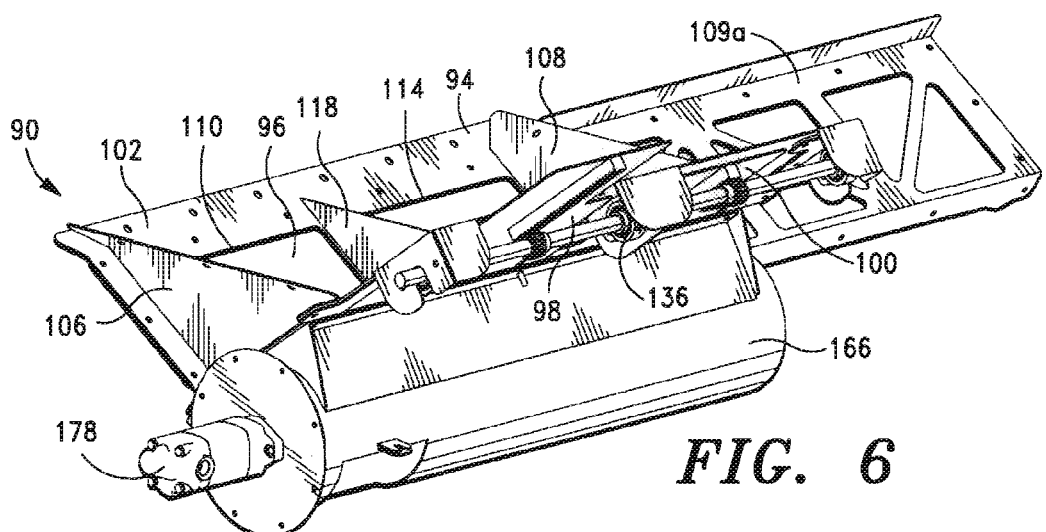
FIG. 6 is a perspective view of a gate that is located at the bottom of the hopper trailer.
Figure 12:
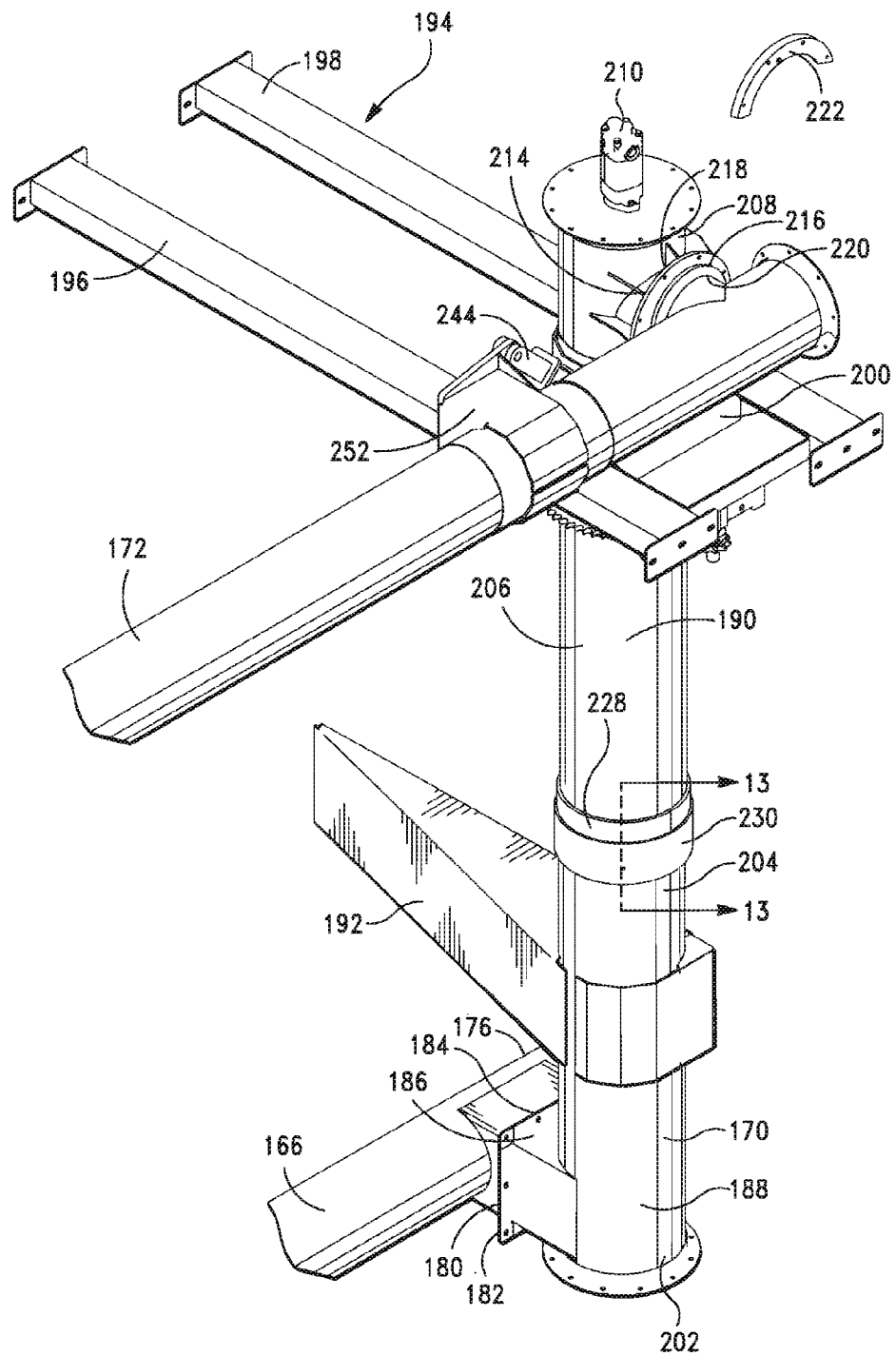
FIG. 12 is a perspective view of a portion of an auger discharge system.

Referring to FIG. 5, the trailer 10 has an auger discharge system 168 which includes first, second, and third auger tubes 166, 170, and 172, respectively. First auger tube 166 is mounted to gates 90 and 92 and as described above has openings (two of which are shown in FIG. 11 as 164*a* and 164*b*) that receive bulk material from hoppers 74, 76, 78, and 80. First auger tube 166 is horizontal and has a first end 174 adjacent gate 90 and a second end 176 adjacent gate 92. Referring to FIG. 2, first auger tube 166 is formed from three sections 166*a*, 166*b*, and 166*c* that are joined together. There is a hydraulic motor 178 mounted on the first end 174 of the first auger tube 166. The hydraulic motor 178 is coupled to a screw auger (not shown) that is positioned within the auger tube 166. The motor 178 is operable to rotate the screw auger which moves bulk material within the auger tube 166 from the first end 174 to the second end 176. Referring to FIG. 12, the first auger tube 166 has a discharge opening 180 adjacent its second end 176 that is in fluid communication with an inlet 182 of the second auger tube 170. Bulk material passes from the first auger tube 166 through the discharge opening 180 into the second auger tube 170 through inlet 182. The first and second auger tubes 166 and 170 have mating flanges 184 and 186 preferably joined with fasteners that surround discharge opening 180 and inlet 182, respectively.

Figure 4:
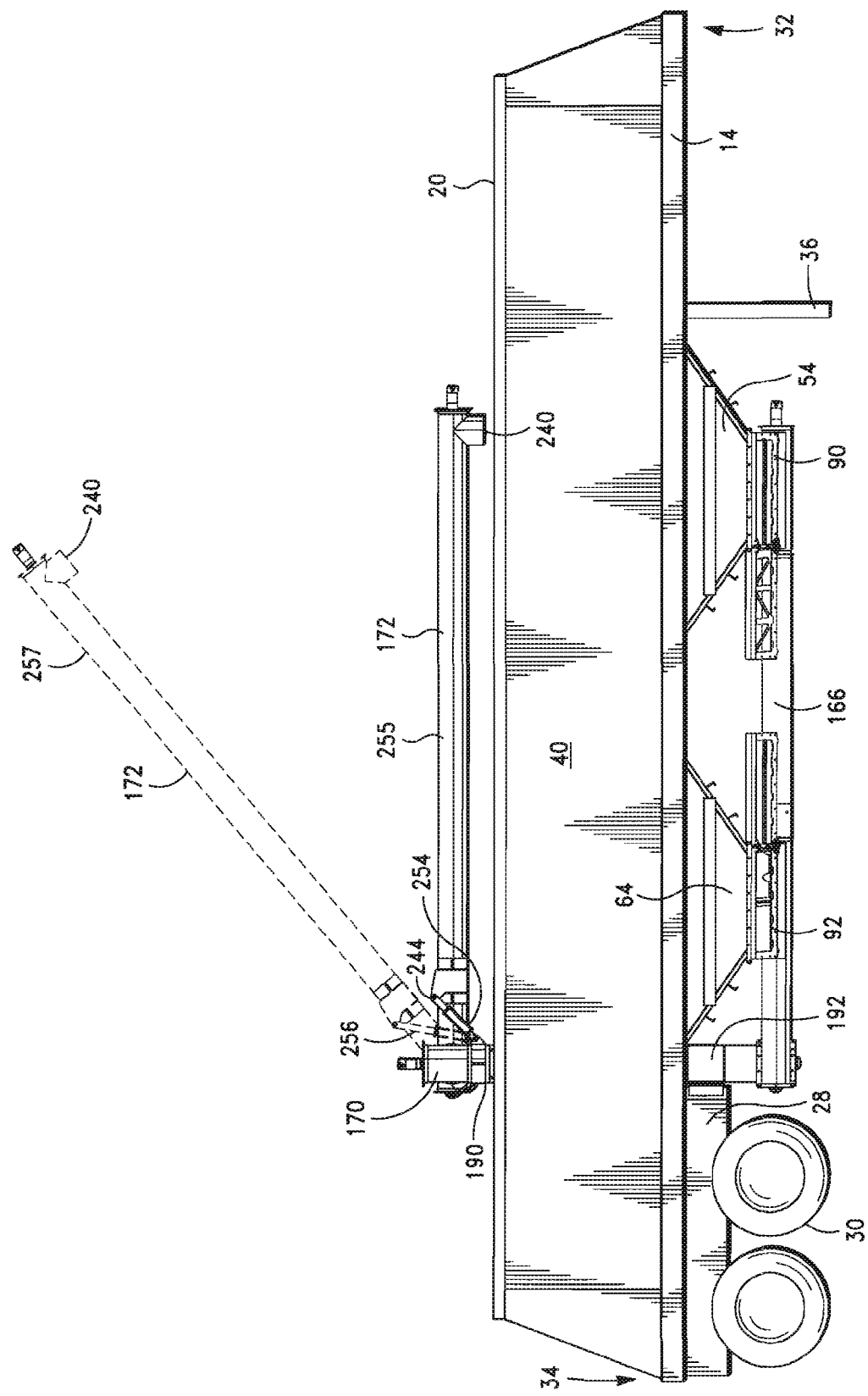
FIG. 4 is a side elevational view of the hopper trailer.

Second auger tube 170 is mounted vertically to the trailer frame 12, as shown in FIG. 1. Referring to FIG. 12, the second auger tube 170 includes a lower section 188 and an upper section 190 that is operable to rotate with respect to the lower section 188. A mounting bracket 192 is joined to the lower section 188 for mounting the lower section 188 to the rear frame structure 28 of the frame 12, as best shown in FIG. 4. As shown in FIG. 1, the upper section 190 is constrained from lateral movement by a brace 194 that mounts to the upper side frame members 20 and 22 of the frame 12. The brace 194 includes two cross bars 196 and 198 positioned on opposite sides of the upper section 190. Each of the cross bars 196 and 198 is mounted to and extends between upper side frame members 20 and 22. A tube brace 200 is positioned between and mounted to each of the cross bars 196 and 198. The tube brace 200 includes an opening that receives the upper section 190 for supporting the upper section and constraining it from lateral movement. The tube brace 200 is not fixedly mounted to the upper section 190 so that the upper section 190 can rotate around a vertical axis passing through its center.

Figure 13:
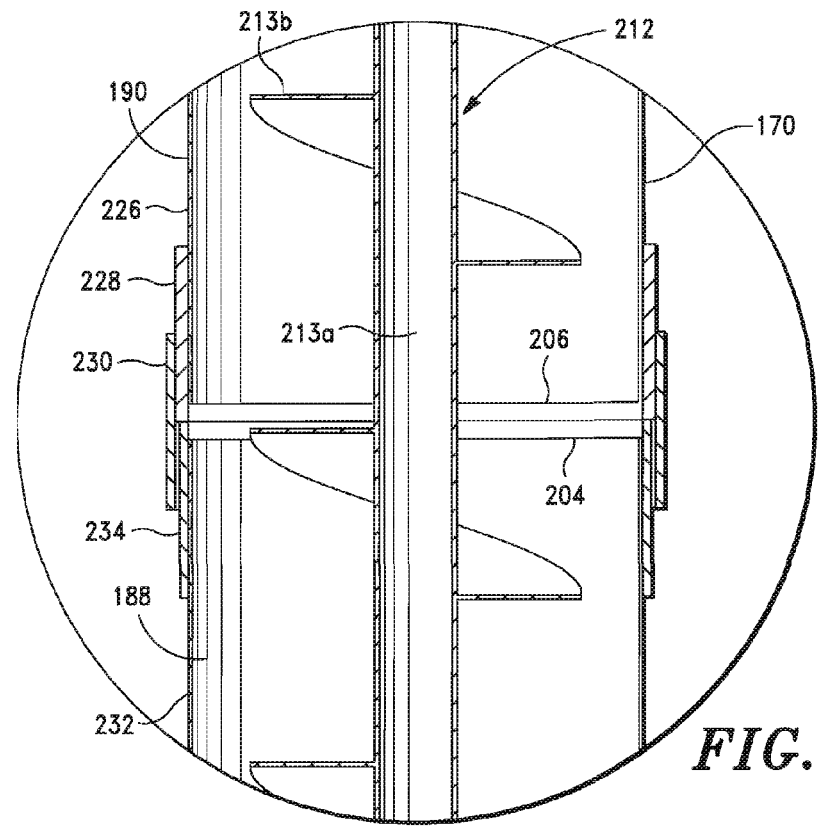
FIG. 13 is a cross-sectional view taken through the line 13-13 in FIG. 12.

Referring to FIG. 12, the lower section 188 has a first end 202 that is positioned adjacent to the second end 176 of the first auger tube 166 and a second end 204. The upper section 190 has a first end 206 that is positioned adjacent to the second end 204 of lower section 188 and a second end 208 that is positioned adjacent to the third auger tube 172. There is a hydraulic motor 210 mounted on the second end 208 of the upper section 190 of the second auger tube 170. The hydraulic motor 210 is coupled to a screw auger 212 (FIG. 13) that is positioned within the auger tube 170. The motor 210 is operable to rotate the screw auger 212 which moves bulk material within the auger tube 170 from the first end 202 of lower section 188 vertically upward to the second end 208 of upper section 190. As shown in FIG. 13, the screw auger 212 includes a shaft 213*a* and a helical screw 213*b* that is joined to the shaft 213*a* for moving bulk material upward through the auger tube 170. The screw augers (not shown) in the first and third auger tubes 166 and 172 have a similar structure as the screw auger 212.

Referring to FIG. 12, the second auger tube 170 has a discharge opening 214 adjacent second end 208 that is in fluid communication with an inlet 216 of the third auger tube 172. Bulk material passes through the discharge opening 214 of the second auger tube 170 into the inlet 216 of the third auger tube 172. A flange 218 surrounds the discharge opening 214 of the second auger tube 170, and a smaller flange 220 surrounds the inlet 216 of the third auger tube 172. A pair of retainers 222 and 224 (FIG. 14) surround the flange 220 on the third auger tube 172 and bolt to the flange 218 on the second auger tube 170 for coupling the second and third auger tubes 170 and 172. The retainers 222 and 224 form a track within which flange 220 can rotate. Retainer 222 is shown in FIG. 12 separated from flange 218 so that flange 220 may be seen. Because the retainers 222 and 224 are not permanently mounted to the third auger tube 172, the third auger tube 172 is operable to rotate with respect to the second auger tube 170 around a horizontal axis that passes through the center of discharge opening 214, as discussed in more detail below.

Referring to FIG. 13, upper section 190 of second auger tube 170 has a cylindrical side wall 226 and a first band 228 permanently joined to an outer surface of the side wall 226. A second band 230 is permanently joined to an outer surface of the first band 228 and extends downward beneath lower edges of the side wall 226 and first band 228. The lower section 188 of third auger tube 170 has a cylindrical side wall 232 and a band 234 that is permanently joined to an outer surface of the side wall 232. The upper edge of band 234 on lower section 188 abuts the lower edge of first band 228 on upper section 190. The second band 230 surrounds the abutting edges of bands 228 and 234 to prevent bulk material from leaking through the joint between the lower and upper sections 188 and 190 and to prevent the lower and upper sections 188 and 190 from moving laterally with respect to one another. Because the lower and upper sections 188 and 190 are not fixedly joined to each other, the upper section 190 is operable to rotate with respect to the lower section 188 around a vertical axis that passes through the center of the lower and upper sections 188 and 190.

Referring to FIG. 1, third auger tube 172 has a first end 236 that is positioned adjacent to the second end 208 of the upper section 190 of the second auger tube 170 and a discharge end 238. The discharge end 238 has a discharge opening 240 through which bulk material flows for discharge into a trailer, a bin, or another desired location. There is a hydraulic motor 242 mounted on the discharge end 238 of the third auger tube 172. The hydraulic motor 242 is coupled to a screw auger (not shown) that is positioned within the auger tube 172. The motor 242 is operable to rotate the screw auger which moves bulk material within the auger tube 172 from the first end 236 to the discharge end 238 and through discharge opening 240.

Figure 14:
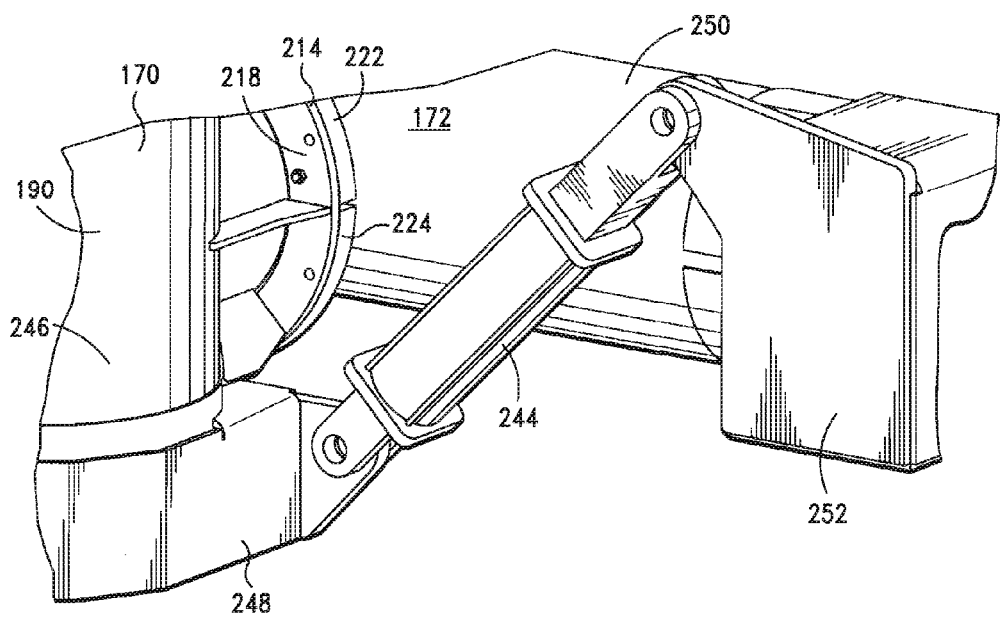
FIG. 14 is a detail view of a hydraulic cylinder for adjusting the height of the upper auger tube.

Referring to FIG. 14, there is a hydraulic cylinder 244 that is mounted to the upper section 190 of the second auger tube 170 and to the third auger tube 172 for rotating the third auger tube 172 with respect to the second auger tube 170 around a horizontal axis that passes through the center of discharge opening 214. The upper section 190 has a cylindrical side wall 246 and a cylinder mounting structure 248 that is joined to the side wall 246. Likewise, the third auger tube 172 has a cylindrical side wall 250 and a cylinder mounting structure 252 that is joined to the side wall 250. The ends of the hydraulic cylinder 244 are mounted to the mounting structures 248 and 252. Referring to FIG. 4, the hydraulic cylinder 244 is extendable between a first position 254 in which the third auger tube 172 is in a generally horizontal first position 255 and a second position 256, shown in dashed lines, in which the third auger tube 172 is rotated with respect to the second auger tube 170 to a second position 257 in which discharge opening 240 is elevated. The hydraulic cylinder 244 is extendable to any length between its first and second positions 254 and 256 so that discharge opening 240 can be elevated to any position between the positions shown in dashed and solid lines in FIG. 4. Preferably, the third auger tube 172 rotates upward approximately 40 degrees when the hydraulic cylinder 244 moves from its first position 254 to its second position 256. As the third auger tube 172 rotates upward the flange 220 (FIG. 12) surrounding the inlet 216 of third auger tube 172 rotates within retainers 222 and 224 (FIG. 14). The upward elevation of discharge opening 240 permits an operator of the trailer 10 to elevate the discharge opening 240 to a desirable elevation for discharging bulk material into another trailer or bin that is taller than trailer 10.

Figure 15:
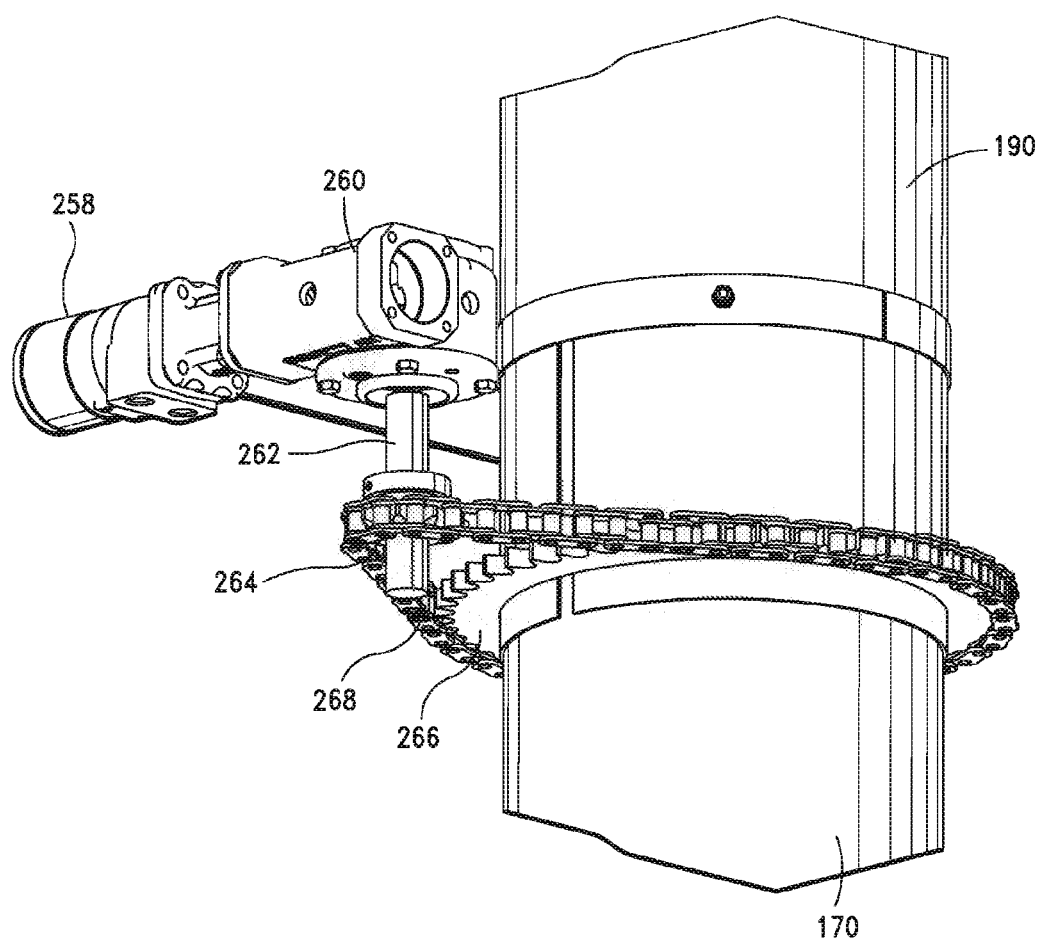
FIG. 15 is a detail view of a drive system for rotating the upper auger tube.

Referring to FIG. 15, there is a hydraulic motor 258 mounted to a right angle gear box 260, which is mounted to a lower surface of tube brace 200 (FIG. 12). The tube brace 200 is not shown in FIG. 15 for clarity. Right angle gear box 260 is coupled with the hydraulic motor 258 via a shaft (not shown). A shaft 262 is coupled with and extends outward from the gear box 260. Motor 258, gear box 260, and shaft 262 are coupled such that operation of motor 258 rotates shaft 262. A sprocket 264 is mounted adjacent to the end of shaft 262 opposite gear box 260, and a sprocket 266 is permanently affixed to the upper section 190 of second auger tube 170. A chain 268 engages the teeth on sprockets 264 and 266 for coupling sprockets 264 and 266. When motor 258 is powered on, shaft 262 and sprocket 264 rotate, which causes rotation of sprocket 266 and the upper section 190 of second auger tube 170 via chain 268. The upper section 190 rotates around a vertical axis that passes through the center of the upper section 190. As described above, as upper section 190 rotates, lower section 188 of the second auger tube 170 remains stationary.

Referring to FIG. 3, rotation of the upper section 190 of second auger tube 170 rotates third auger tube 172 between a first position 270 in which the third auger tube 172 is positioned above hoppers 74, 76, 78, and 80 and a second position 272 in which the third auger tube is rotated approximately 180 degrees from first position 270 to a position where it extends beyond the rear end 34 of the trailer frame 12. The third auger tube 172 may also be rotated to any position between the first and second positions 270 and 272 such as the intermediate positions 274, 276, and 278 shown in FIG. 3. Rotation of third auger tube 172 allows an operator of the trailer 10 to rotate the auger tube 172 to a position in which the discharge opening 240 (FIG. 1) is in a desirable location for discharging bulk material into another trailer or bin. Rotation of the third auger tube 172 allows an operator of the trailer 10 to easily discharge bulk material into trailers and bins that are adjacent to trailer 10 by moving the auger tube 172 into the proper position. As shown in FIG. 2, the third auger tube 172 may be simultaneously both rotated upward by hydraulic cylinder 244 to elevate discharge opening 240 and rotated by hydraulic motor 258 (FIG. 15) so that the auger tube 172 extends outward beyond side wall 42.

The auger discharge system 168 is advantageous because it permits an operator of the trailer to move bulk material within the hoppers 74, 76, 78, and 80 to an elevation that is above the gates 90 and 92 and to an elevation that is above the upper frame members 20, 22, 24, and 26 of the trailer frame 12. The bulk material is then discharged from that elevation through discharge opening 240. Rotation of third auger tube 172 between the positions 255 and 257 shown in FIG. 4 allows an operator of the trailer 10 to discharge bulk material into equipment and bins that are taller than the hoppers 74, 76, 78, and 80. Rotation of the third auger tube 172 between the positions 270, 272, 274, 276, and 278 shown in FIG. 3 also allows an operator to easily discharge bulk material into adjacent equipment and bins without the necessity of maneuvering the entire trailer 10 into a precise position. Further, the first and second auger tubes 166 and 170 and third auger tube 172 when in its first position 270 do not extend beyond the rear end 34 of the trailer frame 12 so that they do not reduce the overall carrying capacity of the trailer. The maximum height, length, and width of over-the-road trailers such as trailer 10 are largely controlled by state law and/or regulation. For instance, depending on the state, the maximum height of a trailer is typically between 13.5 to 14 feet, the maximum width of a trailer is typically approximately 102 inches, and the maximum length of a trailer is typically between 48 to 53 feet. States also regulate the maximum length that an object such as an auger tube can extend beyond the rear end of a trailer's frame. In some states this maximum length is only approximately 3 or 4 feet. Auger tubes 166 and 170 and auger tube 172, when in its first position 270 (FIG. 3), are preferably positioned so that trailer 10 complies with each state's maximum dimensions, which allows trailer 10 to operate on any state's roadways without a special permit or major modification. If the auger tubes 166, 170, and 172 extended beyond the maximum dimensions allowed by the states, then the auger tubes 166, 170, and 172 would decrease the total volume of the trailer 10 available for transporting bulk material.

In operation, bulk material, such as fertilizer or grain, is loaded into hoppers 74, 76, 78, and 80 through top openings 82, 84, 86, and 88, respectively. A semi tractor transports the trailer 10 into a desired location for discharge of the bulk material within the hoppers 74, 76, 78, and 80. To discharge material from hoppers 74 and 76 by gravity to a surface beneath the trailer 10, shaft 120 (FIG. 10) of gate 90 is rotated to move door 96 to its open position so that the bulk material can flow through discharge outlets 110 and 114 (FIG. 7). Material can be discharged from hoppers 78 and 80 by gravity in a similar manner through gate 92. For discharge of material through auger discharge system 168, third auger tube 172 is first preferably rotated and elevated to a desired position as discussed above. Material in hopper 74 is discharged through the discharge opening 240 of auger discharge system 168 by rotating shaft 132 (FIG. 9) to move door 98 to its open position so that the bulk material can flow through discharge outlet 112 (FIG. 7) into the auger discharge system 168. The auger discharge system 168 moves the bulk material to the discharge opening 240 as discussed above. Likewise, material in hopper 76 is discharged through discharge opening 240 by rotating shaft 138 (FIG. 9) to move door 100 to its open position so that the bulk material can flow through discharge outlet 116 (FIG. 7) into the auger discharge system 168. Material is discharged from hoppers 78 and 80 through discharge opening 240 by opening doors in gate 92 in a similar manner as discussed above for hoppers 74 and 76.

The gates 90 and 92 of the trailer 10 permit an operator of the trailer to quickly and easily switch between discharging the bulk material within hoppers 74, 76, 78, and 80 by gravity to the ground or other surface beneath the trailer 10 or discharging the bulk material within the hoppers through the discharge opening 240 of auger discharge system 168. Further, bulk material within one of the hoppers 74, 76, 78, and 80 may be discharged by both gravity to a surface beneath the trailer 10 and through the auger discharge system 168 at the same time because each of gates 90 and 92 has a pair of openings per hopper, one of which discharges material by gravity and the other of which discharges material into the auger discharge system 168. Because gates 90 and 92 are both independently joined to auger discharge system 168 it is also possible to simultaneously discharge material from any number of hoppers 74, 76, 78, and 80 through discharge opening 240.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense. For example, while each of the side and end walls 40, 42, 44, and 46 are shown in the drawings as consisting of single, continuous panels, each of the side and end walls 40, 42, 44, and 46 may be made from any number of panels. Further, it is within the scope of the invention for the trailer 10 to be integral with a tractor such that there is a cab, motor, and front wheel and suspension assembly positioned forward of the end wall 44 of the trailer 10. While augers as auger 212 (FIG. 13) are preferably positioned inside tubes 166, 170, and 172 for moving bulk material within the tubes, it is within the scope of the present invention for the trailer to use a different type of conveyor system for moving material within the tubes.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A trailer for hauling bulk material, comprising:
a hopper configured to retain the bulk material, wherein said hopper comprises at least one side wall defining a bottom opening;
a gate mounted to said hopper adjacent to said bottom opening for regulating discharge of the bulk material through said bottom opening, wherein said gate comprises a frame defining first and second discharge outlets, and first and second doors that are supported by said frame and are each moveable between a closed position that blocks one of said first and second discharge outlets and an open position that allows the bulk material to pass through one of said first and second discharge outlets, and wherein said first discharge outlet is positioned to discharge bulk material by gravity beneath said gate; and
a discharge system mounted to said gate, wherein said discharge system is configured to receive bulk material passing through said second discharge outlet, move the bulk material to an elevation that is above said gate and discharge the bulk material from said elevation, wherein said gate frame comprises first and second walls each joined with first and second end walls, wherein said first discharge outlet is formed in said first wall and said second discharge outlet is formed in said second wall, wherein a third discharge outlet is formed in said first wall and a fourth discharge outlet is formed in said second wall, said first door blocks said third discharge outlet when in its closed position and allows bulk material to pass through said third discharge outlet when in its open position, said gate further comprises a third door that is moveable between a closed position that blocks said fourth discharge outlet and an open position that allows the bulk material to pass through, said fourth discharge outlet, and wherein said discharge system is configured to receive bulk material passing through said fourth discharge outlet.

2. The trailer of claim 1, wherein when both of said first and second doors are in their open position, a first stream of bulk material passes through said first discharge outlet and a second stream of bulk material passes through said second discharge outlet.

3. The trailer of claim 2, wherein said first stream of bulk material flows unobstructed by gravity to the ground beneath said gate, and said second stream of bulk material flows unobstructed from said hopper to said discharge system.

4. The trailer of claim 1, wherein said first and second discharge outlets are positioned such that said hopper can be completely evacuated of bulk material when either of said first or second doors is in its open position.

5. The trailer of claim 1, wherein said first and second walls comprise joined lower edges and upper edges that are spaced apart.

6. The trailer of claim 5, wherein said trailer has a length that is greater than its width, wherein said first door moves in a direction that is parallel to the length of the trailer, wherein a first rack is mounted on a bottom surface of said first door, and wherein said gate further comprises a first shaft rotatably mounted to said frame, said first shaft mounting a first pinion that engages said first rack.

7. The trailer of claim 6, wherein said second door moves in a direction that is perpendicular to the length of the trailer, wherein a second rack is mounted on a bottom surface of said second door, and wherein said gate further comprises a second shaft rotatably mounted to said frame, said second shaft mounting a second pinion that engages said second rack.

8. The trailer of claim 1, further comprising a divider that divides said hopper into first and second sections, wherein bulk material in said first section is dischargeable through said first and second discharge outlets, and wherein bulk material in said second section is dischargeable through said third and fourth discharge outlets.

9. The trailer of claim 1, wherein said discharge system comprises a first generally horizontal tube that is mounted to said gate, and wherein said first tube presents an opening that receives bulk material passing through said second discharge outlet.

10. The trailer of claim 9, wherein said discharge system further comprises a second tube comprising a first end joined to said first tube for receiving bulk material from said first tube, and a second end positioned adjacent to a top of said hopper.

11. The trailer of claim 10, wherein said discharge system further comprises a third tube comprising a first end joined to said second end of said second tube for receiving bulk material from said second tube, and a discharge end.

12. The trailer of claim 11, wherein first, second, and third augers are positioned in said first, second, and third tubes, respectively, for moving bulk material through said first, second, and third tubes from said second discharge outlet to said discharge end.

13. The trailer of claim 11, wherein said second tube comprises upper and lower sections, wherein said upper section is operable to rotate with respect to said lower section, wherein said third tube is joined to said upper section, and wherein said third tube is operable to pivot upward with respect to said upper section to adjustably raise said discharge end above said hopper.

14. The trailer of claim 11, further comprising a trailer frame to which said hopper is joined, said trailer frame having a front end and a rear end, and wherein said first and second tubes do not extend beyond said rear end.

15. A trailer for hauling bulk material, comprising:
a hopper configured to retain the bulk material, wherein said hopper comprises at least one side wall defining a bottom opening;
a gate mounted to said hopper adjacent said bottom opening for regulating discharge of the bulk material through said bottom opening, wherein said gate comprises:
a frame comprising first and second walls each joined with first and second end walls, wherein first and second discharge outlets are formed in said first and second walls, respectively, and
first and second doors that are supported by said frame and are each moveable between a closed position that blocks one of said first and second discharge outlets and an open position that allows the bulk material to pass through one of said first and second: discharge outlets, and wherein said first discharge outlet is positioned to discharge bulk material beneath said gate; and
a discharge system mounted to said gate, wherein said discharge system is configured to receive bulk material passing through said second discharge outlet, move the bulk material to an elevation that is above said gate and discharge the bulk material from said elevation, wherein a third discharge outlet is formed in said first wall and a fourth discharge outlet is formed in said second wall, wherein said first door blocks said third discharge outlet when in its closed position and allows bulk material to pass through said third discharge outlet when in its open position, wherein said gate further comprises a third door that is moveable between a closed position that blocks said fourth discharge outlet and an open position that allows the bulk material to pass through said fourth discharge outlet, and wherein said discharge system is configured to receive bulk material passing through said fourth discharge outlet.

16. The trailer of claim 15, wherein when both of said first and second doors are in their open position, a first stream of bulk material passes through said first discharge outlet and a second stream of bulk material passes through said second discharge outlet.

17. The trailer of claim 16, wherein said first stream of bulk material flows unobstructed by gravity to the ground beneath said gate, and said second stream of bulk material flows unobstructed from said hopper to said discharge system.

18. The trailer of claim 15, wherein said first and second discharge outlets are positioned such that said hopper can be completely evacuated of bulk material when either of said first or second doors is in its open position.

19. The trailer of claim 15, wherein said first and second walls comprise joined lower edges and upper edges that are spaced apart.

20. The trailer of claim 19, wherein said trailer has a length that is greater than its width, wherein said first door moves in a direction that is parallel to the length of the trailer, wherein a first rack is mounted on a bottom surface of said first door, and wherein said gate further comprises a first shaft rotatably mounted to said frame, said first shaft mounting a first pinion that engages said first rack.

21. The trailer of claim 20, wherein said second door moves in a direction that is perpendicular to the length of the trailer, wherein a second rack is mounted on a bottom surface of said second door, and wherein said gate further comprises a second shaft rotatably mounted to said frame, said second shaft mounting a second pinion that engages said second rack.

22. The trailer of claim 15, further comprising a divider that divides said hopper into first and second sections, wherein bulk material in said first section is dischargeable through said first and second discharge outlets, and wherein bulk material in said second section is dischargeable through said third and fourth discharge outlets.

\* \* \* \* \*